(12) United States Patent
Jacobs et al.

(10) Patent No.: US 7,367,529 B2
(45) Date of Patent: May 6, 2008

(54) MOMENTUM TUBE FOR DISTRIBUTED ACTUATION

(75) Inventors: Jack H. Jacobs, Glendale, AZ (US); Mason A. Peck, Ithaca, NY (US)

(73) Assignee: Honeywell International, Inc., Morristown, NJ (US)

( * ) Notice: Subject to any disclaimer, the term of this patent is extended or adjusted under 35 U.S.C. 154(b) by 383 days.

(21) Appl. No.: 10/971,270

(22) Filed: Oct. 22, 2004

(65) Prior Publication Data

US 2006/0086865 A1    Apr. 27, 2006

(51) Int. Cl.
*B64G 1/28* (2006.01)

(52) U.S. Cl. .................. 244/165; 244/166; 244/171

(58) Field of Classification Search ........... 244/164, 244/165, 166, 171
See application file for complete search history.

(56) References Cited

U.S. PATENT DOCUMENTS

| | | | |
|---|---|---|---|
| 3,127,774 A | 4/1964 | Fischer et al. | |
| 3,143,892 A | 8/1964 | Chapman | |
| 4,735,382 A | 4/1988 | Pinson | |
| 5,261,631 A | 11/1993 | Bender et al. | |
| 5,406,858 A | 4/1995 | Brainard | |
| 5,436,516 A | 7/1995 | Yamazaki | |
| 5,611,505 A | 3/1997 | Smay | |
| 5,931,419 A | 8/1999 | Collyer | |
| 6,113,033 A | 9/2000 | Parks et al. | |
| 6,523,785 B1 * | 2/2003 | Hennigan | 244/165 |
| 6,534,887 B1 | 3/2003 | Peczalski et al. | |
| 2006/0091261 A1 * | 5/2006 | Jacobs | 244/164 |

FOREIGN PATENT DOCUMENTS

| | | |
|---|---|---|
| EP | 0496184 | 7/1992 |
| FR | 2347716 | 11/1977 |
| WO | 0229268 A2 | 4/2002 |
| WO | PCTUS2005037835 | 12/2006 |

* cited by examiner

*Primary Examiner*—Timothy D. Collins
(74) *Attorney, Agent, or Firm*—Ingrassia Fisher & Lorenz

(57) ABSTRACT

An spacecraft control system is provided that includes a tube and a plurality of microwheels. The plurality of microwheels is disposed within the tube. Each microwheel has a first stator wafer, a second stator wafer, and a rotor wafer disposed therebetween. The first and second stator wafers are configured to spin the rotor wafer.

25 Claims, 3 Drawing Sheets

MOMENTUM TUBE FOR DISTRIBUTED ACTUATION

FIELD OF THE INVENTION

The present invention generally relates to a spacecraft, and more particularly relates to a system for vehicle and momentum and attitude control of a spacecraft.

BACKGROUND OF THE INVENTION

Spacecraft, such as satellites, typically use attitude and/or momentum control systems, such as control moment gyroscopes (CMG) and reaction wheel assemblies (RWA), for positioning and rotation. CMGs operate by producing a relatively large torque along a first axis when a spinning rotor is rotated with a smaller torque about an axis perpendicular to the rotor spin axis. Accordingly, combinations of CMGs (usually three or more in an array) may be arranged in non-coincidental mounting planes so that the torques may be applied, using various combinations, in any desired direction of rotation. CMGs are most commonly used where large and/or rapid motions, or high inertia equipment, need to be moved with high precision such as in spacecraft slew maneuvers. In contrast, RWAs include a spinning rotor that exerts a relatively small torque along the spin axis as the rotor is caused to spin faster or slower. RWAs may be disposed with several reaction wheels (usually three or more in an array) aligned to cause rotation in any direction. RWAs are usually used where smaller movements are necessary, such as controlling the direction of scan of a sensor, or detector, such as small camera or radar antenna in spacecraft, which operate to view areas or targets on the earth. RWAs are also used to store momentum that is built up by small externally applied torques acting over a long period of time.

Although conventional CMGs and RWAs operate well in many spacecraft, it has been found that both operate less effectively when disposed within a small spacecraft, such as in those spacecraft weighing less than 150 kg. Small spacecraft, increasingly being used to deliver large payloads, may have limited space for containing spacecraft components and thus, the CMGs and RWAs employed therein are smaller. However, smaller-sized CMGs and RWAs may not provide enough torque that may be preferable for moving the payload with the desired agility.

Accordingly, it is desirable for an attitude and/or momentum control system that is capable of providing an adequate amount of torque to move a large payload. In addition, it is desirable for an attitude and/or momentum control system to be capable of being implemented into a small spacecraft. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A spacecraft control system is provided that includes a tube and a plurality of microwheels. The plurality of microwheels is disposed within the tube. Each microwheel has a first stator wafer, a second stator wafer, and a rotor wafer disposed therebetween. The first and second stator wafers are configured to spin the rotor wafer.

In another embodiment, the spacecraft control system includes a plurality of tubes and a plurality of microwheels. Each tube of the plurality of tubes is coupled to and in parallel with at least one other tube. The plurality of microwheels is disposed within each tube. Each microwheel has a first stator wafer, a second stator wafer, and a rotor wafer disposed therebetween, and the first and second stator wafers are configured to spin the rotor wafer.

In yet another embodiment, a satellite is provided that includes a housing, a plurality of tubes, and a plurality of microwheels. The plurality of tubes is disposed within the housing. Each tube of the plurality of tubes is coupled to and in parallel with at least one other tube. The plurality of microwheels is disposed within each tube and each microwheel has a first stator wafer, a second stator wafer, and a rotor wafer disposed therebetween. The first and second stator wafers are configured to spin the rotor wafer.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
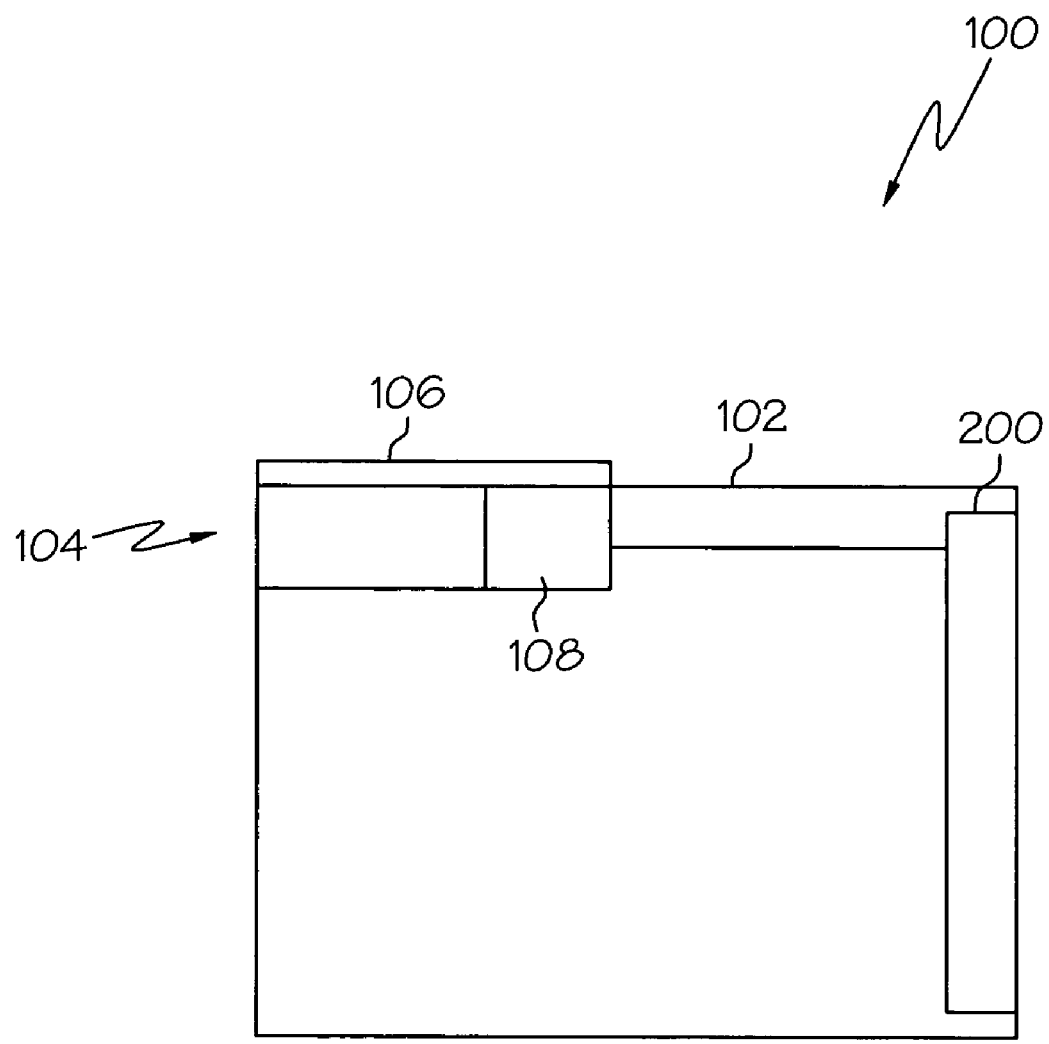
FIG. 1 is a simplified schematic diagram of an exemplary microsatellite.

FIG. 1 depicts an exemplary microsatellite 100 that includes a housing 102, a power subsystem 104, and a spacecraft control system 200 disposed therein. The housing 102 is configured to withstand potentially extreme temperature and pressure changes to which the microsatellite 100 may be subjected when it is launched into space and/or in orbit. It will be appreciated that the housing 102 may be constructed of any one of numerous types of appropriate materials and have any one of numerous suitable sizes and shapes.

The power subsystem 104 includes a power supply 106 and a power storage unit 108. The power supply 106 can be implemented using any one of numerous types of suitable devices that supply power, such as, for example, solar panels. The power storage unit 108 is coupled to the power supply 106 and stores power received therefrom. One or both of the power supply 106 and power storage unit 108 are coupled to the spacecraft control system 200 and are configured to supply power thereto. The power storage unit 108 may be a battery, capacitor or any other suitable device.

Figure 2:
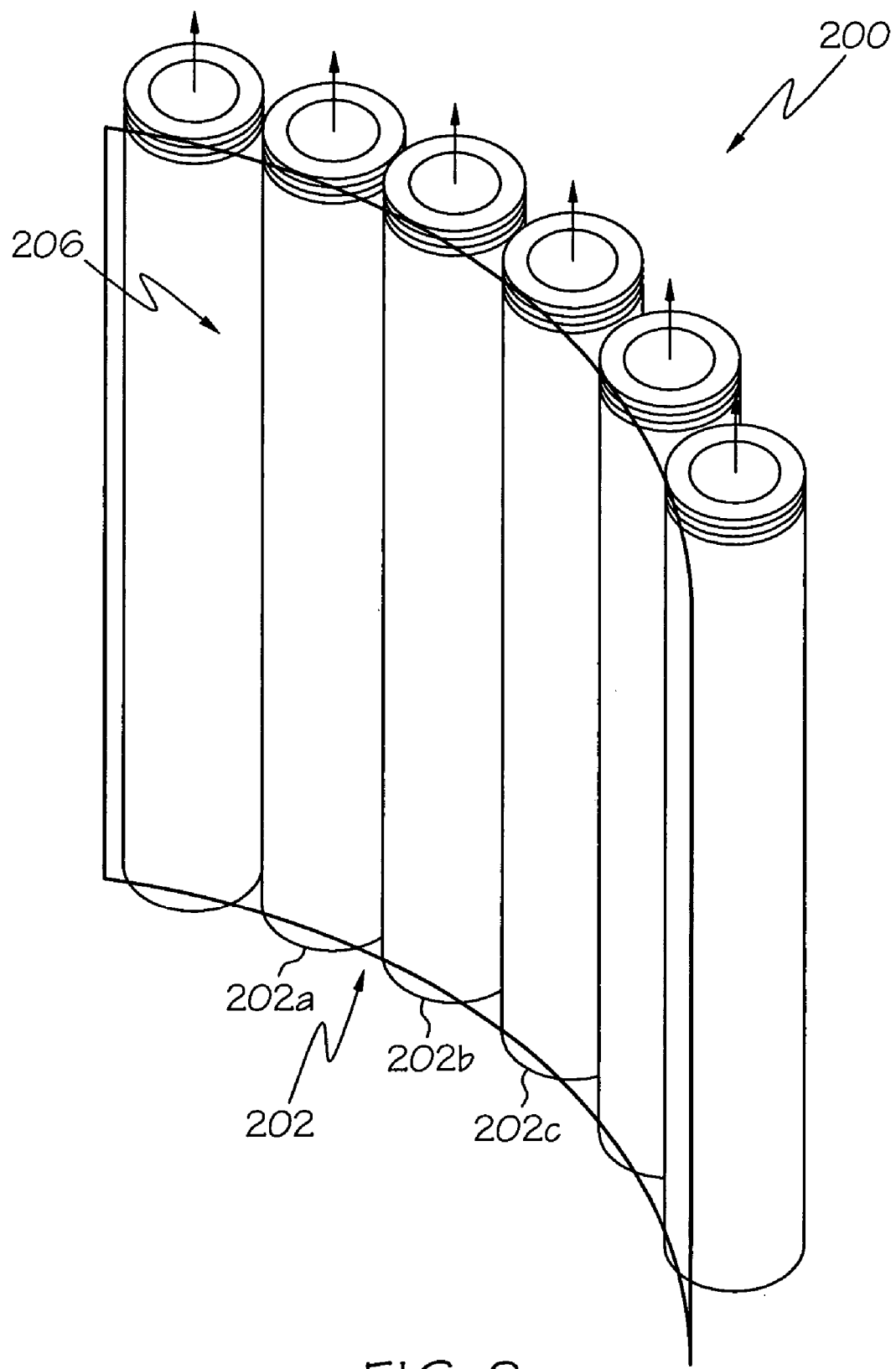
FIG. 2 is an exemplary momentum apparatus that may be used in the exemplary satellite of FIG. 1.

The spacecraft control system 200 is configured to provide 3-axis attitude and/or momentum control for the microsatellite 100. With reference to FIG. 2, the spacecraft control system 200 includes a plurality of tubes 202. Each tube 202a, 202b, 202c of the plurality of tubes 202 is preferably coupled to one another to form a wall 206. The tubes 202 may be coupled to one another in any one of numerous conventional fashions, such as, via adhesives, bonding agents, fasteners, and the like. The formed wall 206 may be curved, or flat, or have any one of numerous other suitable shape. In one exemplary embodiment, the tubes 202 are coupled to the satellite housing 102, and the wall 206 formed by the tubes 202 adapts the shape of the housing 102.

Figure 3:
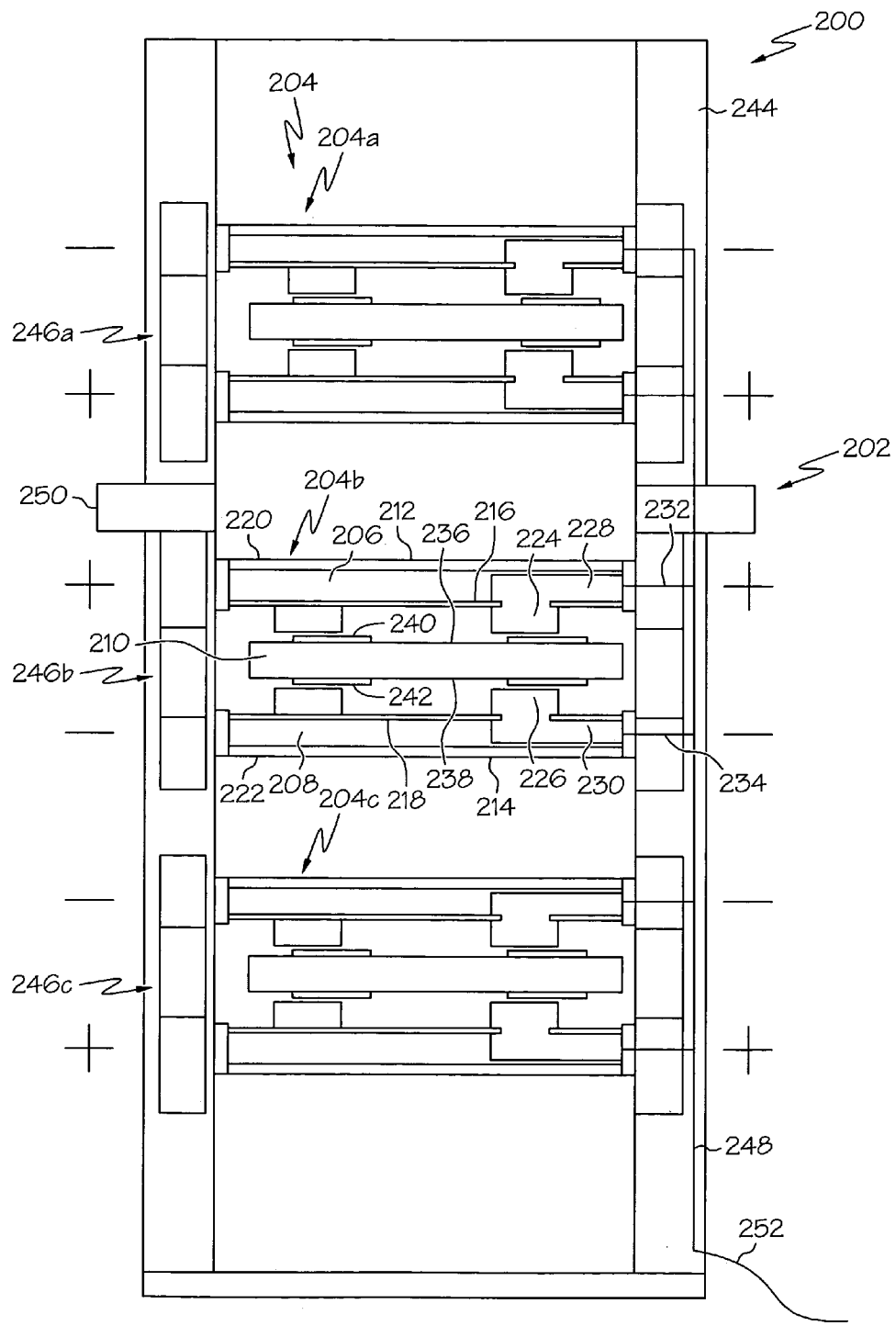
FIG. 3 is an exemplary tube that may be used in the exemplary momentum apparatus of FIG. 2.

Turning to FIG. 3, a cross section view of an exemplary tube 202 is illustrated. Disposed within the tube 202 is one of the pluralities of microwheels 204. The plurality of microwheels 204 includes a top microwheel 204a, a middle microwheel 204b, and a bottom microwheel 204c. It will be appreciated that although three microwheels are shown, fewer or more microwheels may be employed as well. Each microwheel 204 is preferably substantially equally sized and between about 0.5 inches and 6 inches in diameter, most preferably about 2 inches in diameter. However, the microwheels 204 may be smaller or larger, depending on the overall size and configuration of the spacecraft 100. It will be appreciated that if the microwheels 204 are smaller in size, it may be preferable to employ more microwheels 204. Each microwheel 204 includes a first stator wafer 206, a second stator wafer 208, and a rotor wafer 210 disposed therebetween. The first and second stator wafers 206, 208 are configured to couple the microwheel 204 to the tube 202 and to be capable of rotating the rotor wafer 210. Any one of numerous suitable configurations may be employed.

The first and second stator wafers 206, 208 each have an outer surface 212, 214, an inner surface 216, 218, and a magnetic layer 220, 222. The first and second stator wafers 206, 208 are constructed of silicon; however, it will be appreciated that any other suitable material may be used as well. The magnetic layers 220, 222 are preferably coupled to the outer surfaces 212, 214.

The magnetic layers 220, 222 on each of the microwheels 204a, 204b, 204c are employed to properly space each of the microwheels 204a, 204b, 204c along the length of the tube 202. The magnetic layers 220, 222 may be constructed from any type of magnetic material. In the exemplary embodiment depicted in FIG. 3, the magnetic layer 220 disposed on the upper stator wafer outer surface 212 and the magnetic layer 222 disposed on the lower stator wafer outer surface 214 have opposite polarities. However, it will be appreciated that both magnetic layers 220, 222 may have the same polarity, depending on the overall configuration of the microwheel 204.

The first and second stator wafers 206, 208 may be configured to operate in any one of numerous manners, for example, electromagnetically, magnetically, electrostatically, or mechanically, to spin the rotor wafer 210. In one exemplary embodiment, first and second stator wafers 206, 208 each have an electromagnetic coil 224, 226 and electronic components 228, 230. The electromagnetic coils 224, 226 are configured, upon energization to generate a magnetic field across each of the first stator wafer 206 and second stator wafer 208 and are preferably coupled to the inner surfaces 216, 218 of each of the first and second stator wafers 206, 208. Any one of numerous types of electromagnetic coils 224, 226 constructed of any one of numerous appropriate materials may be used. For example, the electromagnetic coils may be a conductive material, such as a copper ring, with a wire coil wrapped around the ring. The electronic components 228, 230 are coupled to each of the electromagnetic coils 224, 226, and are configured to provide power to the electromagnetic coils 224, 226. The electronic components 228, 230 may be any conventional circuit configuration capable of supplying power to the electromagnetic coils 224, 226. In one exemplary embodiment, a multichip module material (MCM) is implemented. No matter the implementation, the electronic components 228, 230 are attached to the first stator wafer 206 and second stator wafer 208, respectively, and each includes an electrical interface 232, 234 that is configured to allow the microwheel 204 to electrically couple to electrical connections in the tube 202, which will be discussed in detail further below.

As briefly mentioned above, the rotor wafer 210 is configured to spin between the first and second stator wafers 206, 208 in any one of numerous manners. In one exemplary embodiment, the rotor wafer 210 levitates between the upper and lower stator wafers 206, 208, for example, magnetically, or electromagnetically, or by other related methods, and includes an upper surface 236, a lower surface 238, and upper and lower magnets 240, 242. The upper magnet 240 is coupled to the rotor wafer upper surface 236 and the lower magnet 242 is coupled to the rotor wafer lower surface 238. Any one of numerous magnetic materials may be used for the magnets 240, 242, however, in one embodiment, permanent magnets constructed from permalloy are employed. In another exemplary embodiment, the rotor wafer 210 is configured to mechanically spin between the stator wafers 206, 208, and bearings, or other mechanical devices, are used in place of the magnets. The rotor wafer 210 may constructed of any suitable material, such as silicon.

It will be appreciated that other microwheel configurations may also be employed, such as those disclosed in U.S. Pat. No. 6,534,887 entitled "Microwheel" issued to Honeywell International Inc. on Mar. 18, 2003, the entirety of which is incorporated herein by reference.

The three microwheels 204a, 204b, 204c are stacked one above another in a predetermined arrangement. In one exemplary predetermined arrangement, the lower stator wafer of the top microwheel 204a and the upper stator wafer of the middle microwheel 204b are the same magnetic polarity and the lower stator wafer of the middle microwheel 204b and the upper stator wafer of the bottom microwheel 204c are the same magnetic polarity. Accordingly, repulsive magnetic forces are generated between the three microwheels 204a, 204b, 204c and the top and middle microwheels 204a, 204b float atop the bottom microwheel 204c. In another exemplary embodiment, some or all of the stator wafers 206, 208 have opposite polarities causing some or all of the microwheels 204a, 204b, 204c to be attracted to one another.

As briefly discussed above, the microwheels 204a, 204b, 204c are disposed within the tube 202. The tube 202 includes a sidewall 244 configured to lock the microwheels 204 at predetermined positions along the length of the tube 202 and to deliver electricity to the microwheels 204. In this regard, any one of numerous suitable configurations, dependent in large part on the predetermined arrangement of the microwheels discussed above, may be implemented. In one exemplary embodiment, such as illustrated in FIG. 3, the sidewall 244 includes magnets 246a, 246b, 246c and electronic circuitry 248. The magnets 246a, 246b, 246c are coupled to the sidewall 244 and configured to magnetically couple with the magnetic layers 220, 222 that are disposed on each of the microwheels 204a, 204b, 204c. It will be appreciated that any one of numerous magnetic materials may be used to construct the magnets 246a, 246b, 246c. For instance, the magnetic material can be a permanent magnet or an electromagnet. The magnets 246a, 246b, 246c are spaced apart such that a first set of magnets 246a is capable of coupling with the magnetic layers 220, 222 of the top microwheel 204a, a second set of magnets 246b is capable of coupling with the magnetic layers 220, 222 of the middle microwheel 204b, and a third set of magnets 246c is capable of coupling with the magnetic layers of the bottom microwheel 204c.

Additionally, each of the magnets 246a, 246b, 246c are configured to have a magnetic polarity that is opposite of the magnetic polarity of the magnetic layers 220, 222 with which they may couple so that the magnets 246a, 246b, 246c and magnetic layers 220, 222 of each microwheel 204a, 204b, 204c will attract and latch to one another.

In another exemplary embodiment, the tube 202 also includes a retainer 250 to help position each microwheel 204a, 204b, 204c in the predetermined positions. The retainer 250 may have any suitable configuration. For example, the retainer 250 may be a ring that is embedded in the tube sidewall 244. The retainer 250 can also be configured to retract into the tube sidewall 244 when electrically actuated. It will be appreciated that although a single retainer 250 is illustrated, more retainers may also be employed.

The electronic circuitry 248 is configured to deliver current to the microwheels 204a, 204b, 204c when they are locked into position along the tube 202. The electronic circuitry 248 may be implemented using any conventional configuration. In one example, the electronic circuitry 248 is a plurality of wires that extends along the length of the tube 202 and that are configured to electrically couple to the electrical interfaces 232, 234. The electronic circuitry 248 may be embedded in the tube 202 or coupled to the tube inner surface 245. The wires include an input end 252 that is electrically coupled to and receives power from the power subsystem 104.

When the power subsystem 104 supplies power to the electronic circuitry 248, the electronic circuitry 248 delivers power to the electronic components 228, 230 which, in turn, deliver power to the microwheels 204. As a result, the rotor wafer 210 is caused to spin between the first and second stator wafers 206, 208. In the embodiment depicted in FIG. 3, power is delivered to the electromagnetic coils 224, 226 and each generates a magnetic field that induces the rotor wafer 210 to levitate and spin between the first and second stator wafers 206, 208. The speed at which the rotor wafer 210 spins may be controlled by varying the amount of current that flows through the electronic circuitry 248. The spinning of the rotor wafer 210 allows the microwheel 204 to act as a flywheel. When only one of the microwheels rotates, a small amount of angular momentum is created; however, when all three microwheels 204a, 204b, 204c rotate in the same direction, the angular momentum is tripled. Thus, the greater the number of microwheels 204 employed in the spacecraft control system 200, the larger the momentum that is created. This momentum can then be used to control the attitude of the microsatellite 100 in all three axes.

An attitude and/or momentum control system has now been provided that is capable of providing an adequate amount of torque to move a large payload. In addition, the system is capable of being implemented into a small spacecraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An spacecraft control system, comprising:
   a tube; and
   a plurality of microwheels disposed within the tube, each microwheel having a first stator wafer, a second stator wafer, and a rotor wafer disposed therebetween, the first and second stator wafers configured to spin the rotor wafer, wherein substantially only the microwheels are in the tube.

2. The spacecraft control system of claim 1, wherein the first and second stator wafers and rotor wafer comprise silicon disks.

3. The spacecraft control system of claim 1, wherein the first and second stator wafers are configured to magnetically levitate and spin the rotor wafer.

4. The spacecraft control system of claim 3, wherein the first and second stator wafers each include electromagnetic coils coupled thereto and the first stator wafer electromagnetic coil is configured to have polarity that is opposite of the polarity of the second stator wafer electromagnetic coil.

5. The spacecraft control system of claim 4, wherein the first and second stator wafers have electrical circuitry embedded therein.

6. The spacecraft control system of claim 5, wherein each of the electromagnetic coils further comprises a magnet coupled to one of the first and second stator wafers and in communication with the electrical circuitry.

7. The spacecraft control system of claim 5, wherein the tube has electrical connections and the tube electrical connections are in electrical communication with the stator wafer electrical circuitry.

8. The spacecraft control system of claim 3, wherein the rotor wafer has a first side, a second side, and magnets coupled to the first and second sides, wherein the magnets have opposite magnetic polarities.

9. The spacecraft control system of claim 1, wherein the first and second stator wafers are configured to electrostatically spin the rotor wafer.

10. The spacecraft control system of claim 1, wherein the first and second stator wafers each have an outer peripheral surface, and a magnet is coupled to each outer peripheral surface.

11. The spacecraft control system of claim 10, wherein the tube has an inner surface and first and second magnets are coupled to the tube inner surface, the first and second stator wafers disposed proximate the first and second magnets respectively, the first stator magnet having a magnetic polarity opposite of the magnetic polarity of the inner surface first magnet and the second stator magnet having a magnetic polarity opposite of the magnetic polarity of the inner surface second magnet.

12. The spacecraft control system of claim 1, wherein the plurality of microwheels comprises a first microwheel and a second microwheel, each disposed within the tube, the first microwheel disposed below the second microwheel, the first stator wafer of the first microwheel having a magnetic polarity and the second stator wafer of the second microwheel having an opposite magnetic polarity.

13. The spacecraft control system of claim 1, wherein each rotor wafer is configured to spin in the same direction.

14. The spacecraft control system of claim 1, wherein each rotor wafer is capable of spinning at different speeds.

15. A spacecraft control system comprising:
a plurality of tubes, wherein each tube is coupled to and in parallel with at least one other tube; and
a plurality of microwheels disposed within each tube, each microwheel having a first stator wafer, a second stator wafer, and a rotor wafer disposed therebetween, the first and second stator wafers configured to spin the rotor wafer.

16. The spacecraft control system of claim 15, wherein each microwheel is configured to spin in the same direction.

17. The spacecraft control system of claim 15, wherein the first and second stator wafers are configured to magnetically levitate and spin the rotor wafer.

18. The spacecraft control system of claim 15, wherein the first and second stator wafers are configured to electrostatically spin the rotor wafer.

19. The spacecraft control system of claim 15, wherein the plurality of tubes is configured to be disposed within a microsatellite.

20. The spacecraft control system of claim 15, wherein at least three of the plurality of tubes form a curved wall.

21. A satellite, comprising:
a housing;
a plurality of tubes disposed within the housing, wherein each tube is coupled to and in parallel with at least one other tube; and
a plurality of microwheels disposed within each tube, each microwheel having a first stator wafer, a second stator wafer, and a rotor wafer disposed therebetween, the first and second stator wafers configured to spin the rotor wafer.

22. The satellite of claim 21 wherein at least three of the plurality of tubes form a curved wall.

23. The satellite of claim 21, wherein the housing further comprises a sidewall and the plurality of tubes is coupled to the sidewall.

24. The satellite of claim 21, wherein the first and second stator wafers are configured to magnetically levitate and spin the rotor wafer.

25. The satellite of claim 21, wherein the first and second stator wafers are configured to electrostatically levitate and spin the rotor wafer.

* * * * *